United States Patent [19]

Bullers, Sr.

[11] Patent Number: 5,510,933
[45] Date of Patent: Apr. 23, 1996

[54] BINOCULARS WITH BUILT-IN GYROSCOPE FOR STEADYING

[76] Inventor: Carl E. Bullers, Sr., 208 Rte. 85, Home, Pa. 15747

[21] Appl. No.: 285,118

[22] Filed: Aug. 3, 1994

[51] Int. Cl.⁶ ................................................. G02D 23/00
[52] U.S. Cl. .......................... 359/430; 359/407; 359/409
[58] Field of Search ..................................... 359/404–418, 359/430, 554–557, 896; 33/275 G, 313–329, 230–240, 275 R, 290, 292, 370; 224/909

[56] References Cited

U.S. PATENT DOCUMENTS

| | | | |
|---|---|---|---|
| 407,786 | 7/1889 | Melhouse | 33/276 |
| 2,570,130 | 10/1951 | Kenyon | 33/275 G |
| 3,706,137 | 12/1972 | Wu et al. | 359/554 |
| 3,864,015 | 2/1975 | Ilg | 359/413 |
| 4,278,320 | 7/1981 | Carreira, Sr. | 359/407 |
| 5,221,991 | 6/1993 | Webster | 359/407 |

FOREIGN PATENT DOCUMENTS 114816  6/1985  Japan ..................................... 359/407

*Primary Examiner*—Paula M. Dzierzynski
*Assistant Examiner*—Thong Nguyen

[57] ABSTRACT

A pair of binoculars with built-in gyroscope for steadying comprising: a housing comprising a first housing half and a second housing half with a pivotal coupling to secure the housing halves together, each of the housing halves having lenses for optical magnification, the housing halves and lenses having normally horizontal optical axes essentially parallel with respect to each other; a supplemental housing in a cylindrical configuration having an axis centrally disposed between the optical axes and perpendicular thereto, the supplemental housing being located between the optical halves adjacent at an intermediate extent thereof; and a gyroscope having a shaft coincident with the axis of the supplemental housing, the gyroscope having an enlarged circular periphery and radial supports between the shaft and the periphery.

1 Claim, 4 Drawing Sheets

BINOCULARS WITH BUILT-IN GYROSCOPE FOR STEADYING

BACKGROUND OF THE INVENTION

1. Field of the Invention

The present invention relates to binoculars with built-in gyroscope for steadying and more particularly pertains to utilizing a gyroscope in association with binoculars for holding steady tile binoculars during use.

2. Description of the Prior Art

The use of binoculars is known in the prior art. More specifically, binoculars heretofore devised and utilized for the purpose of holding steady objects of various designs and configurations including optical devices through a wide variety of methods and apparatuses are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,446,980 a stabilized sight system employing autocollimation or gyro-stabilized light beam to correct yaw and pitch orientation of coupled sight line and servo system mirrors.

U.S. Pat. No. 4,316,649 discloses a stabilized zoom binocular.

U.S. Pat. No. 4,898,311 discloses a binocular stabilizer device.

U.S. Pat. No. 5,058,571 discloses a hand-held gyroscope device.

U.S. Pat. No. Des. 338,218 discloses the design of binoculars.

In this respect, the binoculars with built-in gyroscope for steadying according to the present invention substantially depart from the conventional concepts and designs of the prior art, and in doing so provide an apparatus primarily developed for the purpose of utilizing a gyroscope in association with binoculars for holding steady the binoculars during use.

Therefore, it can be appreciated that there exists a continuing need for new and improved binoculars with built-in gyroscope for steadying which can be used for utilize a gyroscope in association with binoculars for holding steady the binoculars during use. In this regard, the present invention substantially fulfills this need.

SUMMARY OF THE INVENTION

For the purpose of summarizing the invention, the invention may be incorporated into a new and improved binoculars with built-in gyroscope for steadying comprising, in combination: a housing comprising a first housing half and a second housing half with means to pivotally couple the housing halves together, each of the housing halves having lenses for optical magnification, the housing halves and lenses having normally horizontal optical axes essentially parallel with respect to each other; a supplemental housing in a cylindrical configuration having a normally vertical axis centrally disposed between the optical axes and perpendicular thereto, the supplemental housing being located between the optical halves adjacent at an intermediate extent thereof; a gyroscope having a shaft coincident with the axis of the supplemental housing, the gyroscope having an enlarged circular periphery and radial supports between the shaft and the periphery; and an additional housing between the optical halves with an electric assembly therein, the assembly including a motor and an associated power source, the motor being coupled to drive the shaft of the gyroscope to effect its rotation, the electrical assembly also including a trigger with a first orientation to energize the motor to rotate the gyroscope and a second orientation to inactivate the motor and stop the rotation of the gyroscope.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide new and improved binoculars with built-in gyroscope for steadying which have all the advantages of the prior art binoculars and none of the disadvantages.

It is another object of the present invention to provide new and improved binoculars with built-in gyroscope for steadying which may be easily and efficiently manufactured and marketed.

It is further object of the present invention to provide new and improved binoculars with built-in gyroscope for steadying which are of durable and reliable constructions.

An even further object of the present invention is to provide new and improved binoculars with built-in gyroscope for steadying which are susceptible of a low cost of manufacture with regard to both materials and labor, and which accordingly are then susceptible of low prices of sale to the consuming public, thereby making such binoculars with built-in gyroscope for steadying economically available to the buying public.

Still yet another object of the present invention is to provide new and improved binoculars with built-in gyroscope for steadying which provide in the apparatuses and methods of the prior art some of the advantages thereof, while simultaneously overcoming some of the disadvantages normally associated therewith.

Still another object of the present invention is to utilize a gyroscope in association with binoculars for holding steady the binoculars during use.

Lastly, it is an object of the present invention to provide a new and improved pair of binoculars with built-in gyroscope for steadying comprising: a housing comprising a first housing half and a second housing half with means to pivotally couple the housing halves together, each of the housing halves having lenses for optical magnification, the housing halves and lenses having normally horizontal optical axes essentially parallel with respect to each other; a supplemental housing in a cylindrical configuration having an axis centrally disposed between the optical axes and perpendicular thereto, the supplemental housing being located between the optical halves adjacent at an intermediate extent thereof; and a gyroscope having a shaft coincident with the axis of the supplemental housing, the gyroscope having an enlarged circular periphery and radial supports between the shaft and the periphery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
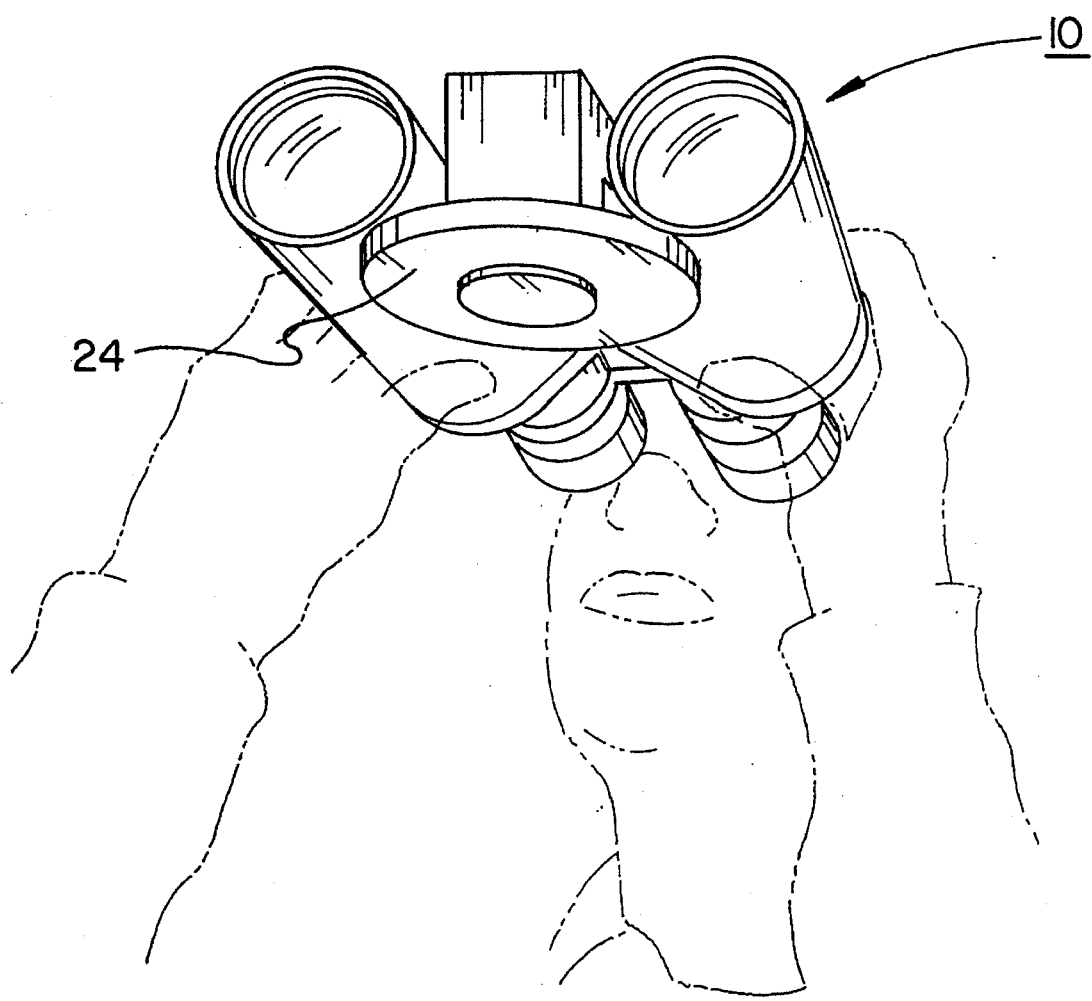
FIG. 1 is a perspective view of the preferred embodiment of the new and improved binoculars with built-in gyroscope for steadying constructed in accordance with the principles of the present invention.
Figure 2:
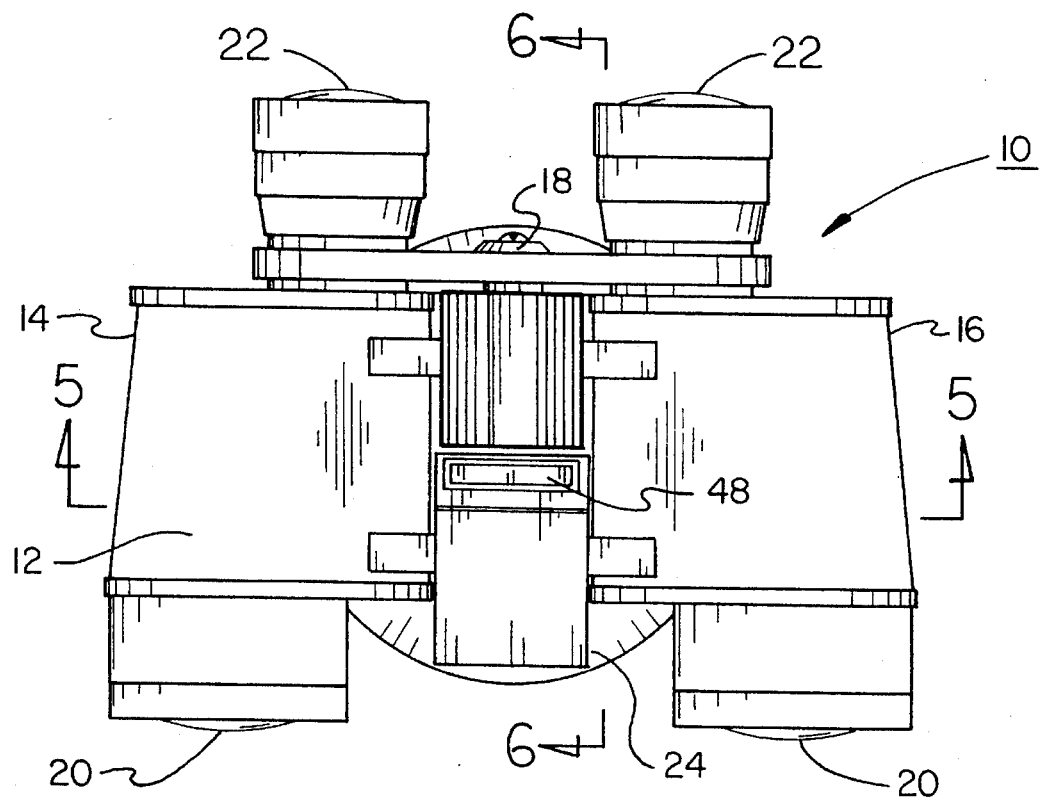
FIG. 2 is a top elevational view of the binoculars shown in FIG. 1.
Figure 3:
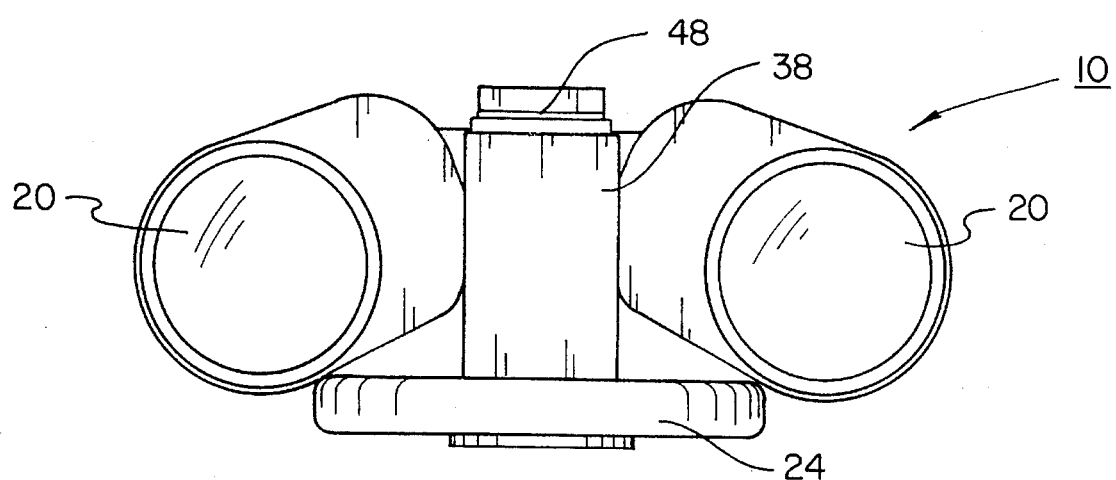
FIG. 3 is a front elevational view of the binoculars shown in FIGS. 1 and 2.
Figure 4:
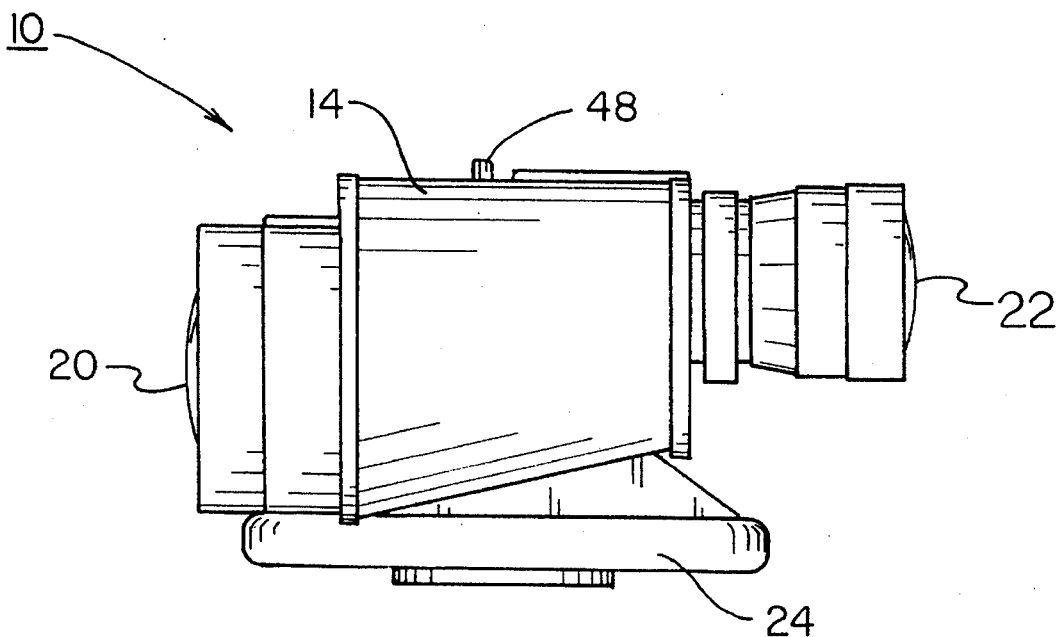
FIG. 4 is a side elevational view of the binoculars of the prior Figures.
Figure 5:
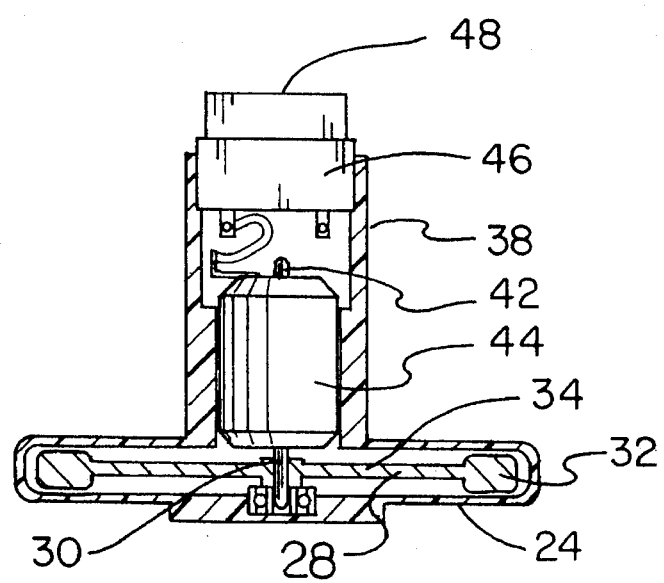
FIG. 5 is a cross-sectional view of the binoculars taken along line 5—5 of FIG. 2.
Figure 6:
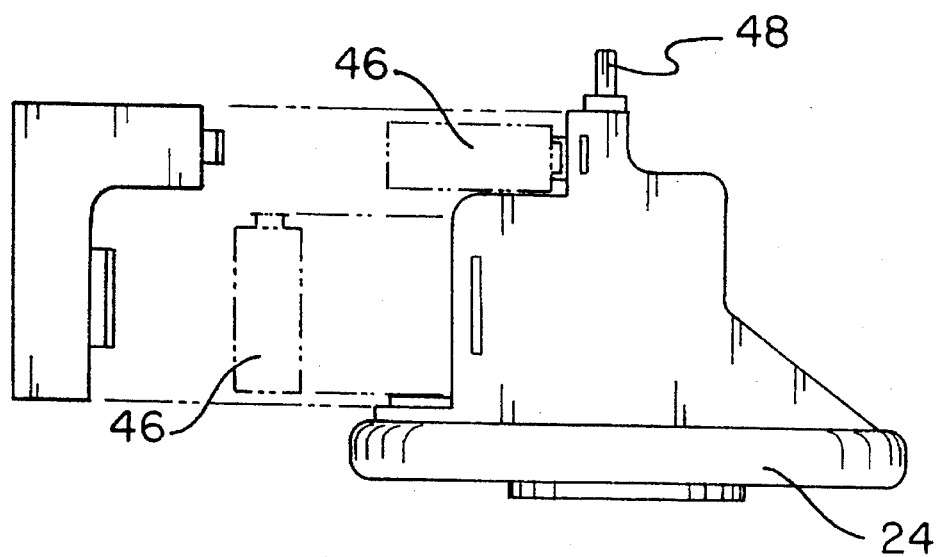
FIG. 6 is a cross-sectional view taken along line 6—6 of FIG. 2 but shown in an exploded configuration.

With reference now to the drawings, and in particular to FIG. 1 thereof, the preferred embodiment of the new and improved binoculars with built-in gyroscope for steadying embodying the principles and concepts of the present invention and generally designated by the reference numeral 10 will be described.

The present invention, the new and improved binoculars with built-in gyroscope for steadying is comprised of a plurality of components. Such components, in their broadest context, include a housing formed of a first housing half and a second half, a supplemental housing, a gyroscope in the supplemental housing, an additional housing and an electrical assembly within the additional housing. Such components are individually configured and correlated with respect to each other so as to attain the desired objective.

The central component of the system 10 of the present invention is a housing 12. The housing is comprised of a first housing half 14 and a second housing half 16. The housing halves are of a similar construction. The housing halves are also formed with a pivotal coupling 18 between the housing halves securing them together at any of a plurality of angular orientations. Each of the housing halves has an objective lens 20 positioned in the frontmost section of the binoculars, and an eyepiece lens 22 positioned in the rearmost section of the binocular, both of the lenses facilitating optical magnification. The housing halves and lenses have normally horizontal optical axes essentially parallel with respect to each other.

Next provided is a supplemental housing 24. The supplemental housing is in a cylindrical configuration. It has a normally vertically axis. Such axis is centrally disposed between the optical axes of the housing halves. Such vertical axis is also perpendicular to the optical axes. The supplemental housing is located between the housing halves of the housing adjacent thereto at an intermediate extent of the housing halves.

Next provided is a gyroscope 28. The gyroscope has a shaft 30 with its axis of rotation coincident with the axis of the supplemental housing. The gyroscope also has an enlarged circular periphery 32. In addition, radial supports 34 coupled between the shaft and the periphery. In this manner, rotation of the shaft will effect the rotation of the periphery to effect the gyroscopic effect.

Next provided is an additional housing 38. Such additional housing is coupled to the pivotal coupling 18 of the housing halves 14 and 16. The additional housing is further coupled at the upper extent thereof to the supplemental housing 24. Within the additional housing is an electrical assembly 42. The electrical assembly includes a motor 44 and an associated power source 46. The power source is preferably self-contained and includes, preferably, batteries. The motor is coupled to the shaft of the gyroscope to effect its rotation freely within the supplemental housing.

Figure 7:
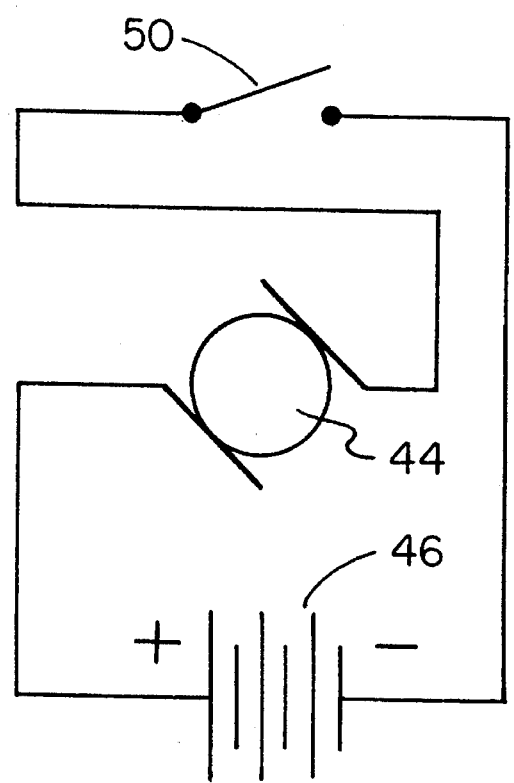
FIG. 7 is an electrical schematic of the power source for driving the gyroscope of the binoculars of the prior Figures.

The electrical assembly also includes a trigger 48 having a switch 50. The trigger is positioned on the top of the power source as shown in FIG. 7. The trigger is operable in a first orientation to energize the motor to rotate the gyroscope. The trigger is also positionable in a second orientation to inactivate the motor and stop the rotation of the gyroscope. Normally the trigger is in the inoperative position. An operator may effect the trigger to the operative position by pressing the button with a finger.

The present invention is binoculars which have a built-in, self-contained gyroscope which will steady them so they can be held in the hand. Since it is almost impossible to hold a pair of binoculars in the hand without shaking, tripods are commonly used. However, when a tripod is unavailable or cannot be set up, these binoculars offer a very viable alternative.

A gyroscope is a mechanical device which seems to defy the law of gravity. It basically consists of a spinning wheel which is mounted in a movable frame. It can balance at an angle when placed on a fingertip or the rim of a glass, and even if pushed gently, it will not fall. Gyroscopes are used in navigating aircraft and ships because they are not affected by the pitching and rolling.

The wheel is driven by a self-contained electric motor, powered by a tiny storage battery mounted in the housing. The frame, in turn is supported by bearings mounted in an outer gimbal. While the wheel axle can be pointed in any direction, the exact center always remains in a fixed position within the gimbals.

The gyroscope in the present invention is mounted in a plastic case under the binoculars. When a button on the top is pressed down with the index finger, the motor is started and continues to run. After only two or three seconds it is in full operation to steady the binoculars. A spare battery could be stored in a small compartment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. New and improved binoculars with built-in gyroscope for steadying comprising, in combination:

a housing comprising a first housing half and a second housing half with means to pivotally couple the housing halves together, each of the housing halves having lenses for optical magnification;

a supplemental housing in a cylindrical configuration located between the optical halves adjacent at an intermediate extent thereof;

a gyroscope having a shaft coincident with an axis of the supplemental housing, the gyroscope having an enlarged circular periphery and radial supports between the shaft and the periphery; and an additional housing coupled to the pivotal coupling means of the housing halves and further coupled to an upper extent of the supplemental housing, the additional housing including an electric assembly coupled therein, the assembly including a motor and an associated power source, the motor for driving the shaft of the gyroscope to effect its rotation freely within the supplemental housing, the electrical assembly also including a trigger with a first orientation to energize the motor to rotate the gyroscope and a second orientation to inactivate the motor and stop the rotation of the gyroscope.

* * * * *